April 26, 1927. 1,625,798
W. M. DOERING ET AL
ADVERTISING DEVICE AND REFLECTOR THEREFOR
Filed Jan. 11, 1924 3 Sheets-Sheet 1

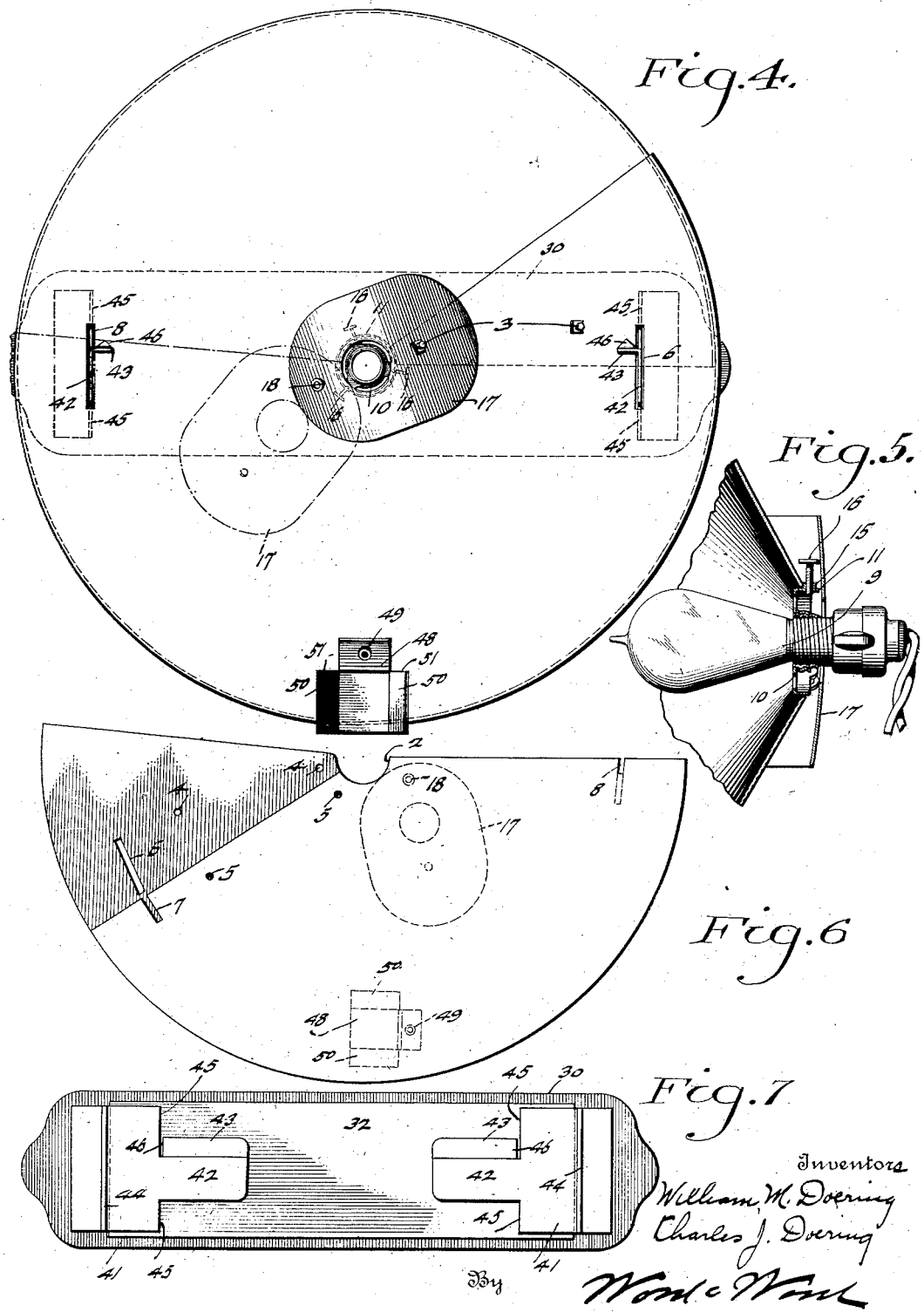

Patented Apr. 26, 1927.

1,625,798

UNITED STATES PATENT OFFICE.

WILLIAM M. DOERING AND CHARLES J. DOERING, OF CINCINNATI, OHIO.

ADVERTISING DEVICE AND REFLECTOR THEREFOR.

Application filed January 11, 1924. Serial No. 685,700.

This invention relates generally to illuminating or reflecting devices adapted to project or reflect light in definite directions and has among its objects to provide a cheap reflector which may be conveniently attached to, or to which may be attached, advertising display placards, automobile tires, or tire casings and the like, for illuminating advertising matter associated therewith.

Another object of the invention is to provide a knockdown reflector made from a blank of paper or other sheet material and adapted when properly manipulated to form a reflector having an opening at its apex as a support for an illuminating device.

Another object is to provide a foldable or knockdown reflector having means thereon, preferably at its apex, for detachably supporting an illuminating device at its interior.

Another object is to provide a light permeable sign of sheet material, having means thereon for detachably locking the sign across a reflector, in spaced relation thereto.

A feature of the invention resides in the manner of attaching a light permeable sign across the outer open or base end of the reflector, but without entirely closing the base end, whereby rays of light traverse the sign and also pass outwardly around the same. In this feature the invention finds useful application in tire casing advertising, another object being to provide a cheap knockdown device adapted to be supported in display position by the tire, the said device being insertable within the tire casing for that purpose.

Another object is to provide a foldable knockdown advertising device comprising a reflector element and a placard or advertising element, said elements being unitarily attachable in a manner for illuminating the advertising element.

Another object is to provide a foldable knockdown advertising device including cooperable reflector and advertising elements unitarily connectible for disposing the advertising devices or elements substantially diametrically across the base end of the reflector element to partially or entirely close that end, said advertising element being thus disposed for traversal by light rays.

Another object of the invention is to provide means for detachably locking the reflector and advertising elements together.

Another object is to provide means for maintaining a fixed relation between a tire, reflector and advertising element supported by the reflector, whereby the parts are centered with respect to the tire and so maintained.

Another object is the provision of an advertising device, having a reflector member and interchangeable advertising elements, attachable to the reflector member, whereby the character of advertising may be varied by successively substituting a series of elements containing the desired advertising matter.

Other objects and certain advantages will appear from the description and drawings forming a part of this specification, in which drawings:

Figure 4 is a rear view of the reflector and advertising elements in set up condition.

Figure 5 is a detail section on line 5—5, of Fig. 1, illustrating the detachable support for supporting an illuminating device, and showing the locking means therefor.

Figure 6 is a view of the reflector body in knockdown condition.

Figure 7 is a detail rear view of our improved sign showing the locking devices thereon for cooperation with corresponding devices of the reflector, whereby the sign is detachably secured across the base end thereof.

Figure 1:
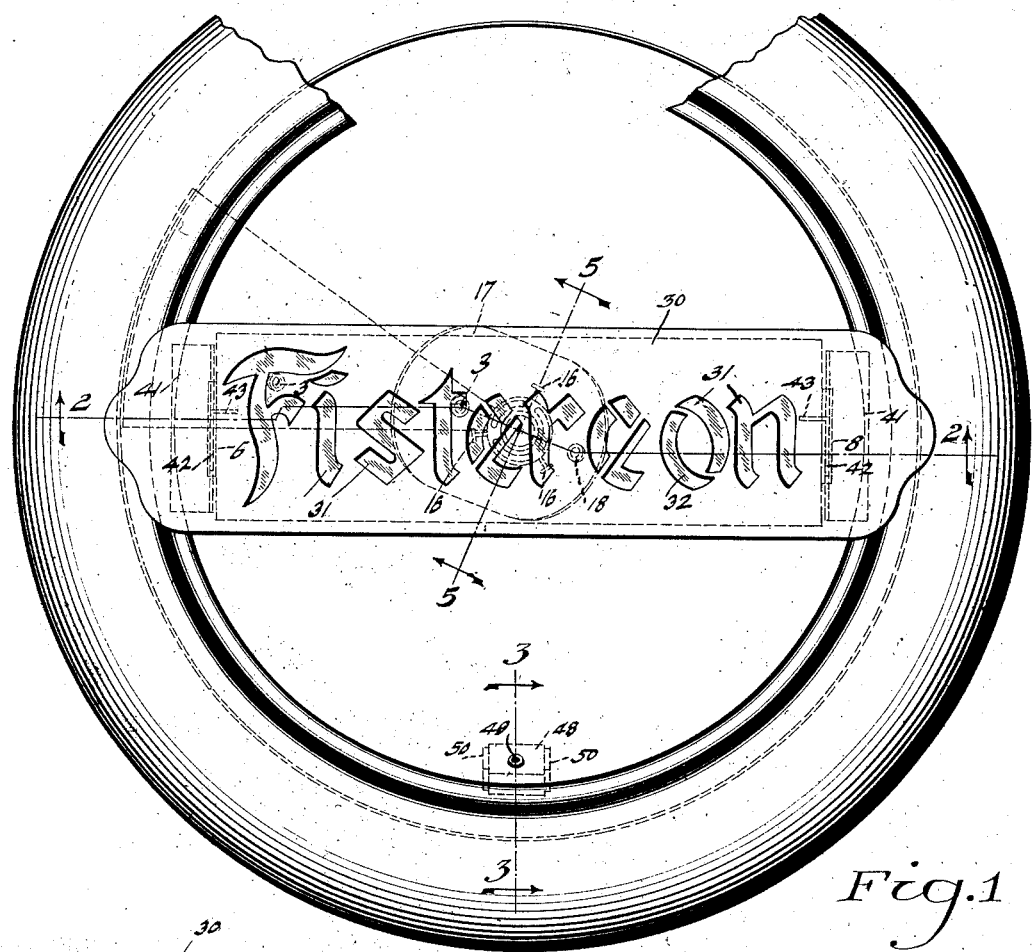
Figure 1 is a front face view of one form of the device as applied to a tire casing.

In the embodiment of the invention herein shown the conical reflector element is formed from a blank of sheet material, such as cardboard, which is cut to circular form and then cut centrally as at 2 to provide a circular opening at the apex of the reflector when set up. A sector shaped portion of the sheet is removed to form a substantially V-shaped notch the edges of which are radially related to and intersect the central opening 2. When the edges are brought together and overlapped a hollow frustrum conical body is formed having an aperture at its truncated end. As more clearly shown in Figure 4, the overlapped portions of the blank are fastened by suitable devices 3 such as bolts which traverse the openings 4, 5. The blank is further slotted and notched as at 6, 7, 8, and the slot 6 and notch 7 are adapted for cooperation to vary slot length when it is desired to change the diameter of the base end of the reflector. Slots 6, 8 are substantially diametrically related when the reflector is set up and said slots are adapted to be traversed by interlocking members attached to an advertising element or sign which element is thus adapted to be detachably secured to the reflector entirely across the base end, preferably diametrically thereto. The advertising element only partially closes the base end, and is herein formed of transparent or translucent material backed or mounted upon stiffening material to which the fastening devices above mentioned are secured. When the reflector is set up and the advertising element attached, said element is preferably spaced outwardly from the base end but under certain conditions may be engaged against the same.

A lamp socket is supported in the opening, at the truncated end or apex of the reflector, which socket is designed to support an illuminating device such as an incandescent light 9, at the interior of the reflector. The lamp socket has the ordinary sheet metal construction and comprises two concentric rings 10, 11, suitably connected together, the inner ring 10 having pressed screw threads with which, in this instance, the light 9 is engaged. The outer ring 11 is fitted snugly in the opening and has projections 15. The projections 15 are bored and threaded and have engaged therewith the threads of headed screws 16 extending radially outwardly from the outer ring for positively preventing slipping of the ring forwardly through the opening. The outer peripheries of the circular heads of the screws 16 are engaged by a locking device or retainer, 17, formed of a bendable material, such as cardboard, which retainer when in locking position sustains the lamp socket against rearward displacement. The retainer element 17 is pivotally attached as at 18 to the reflector body and may be conveniently swung about the pivot to locking or unlocking position. One of the bolts 3 which hold the overlapping ends of the reflector body, also traverses and locks the retainer element. A spacer nut 20, (see Fig. 2) is interposed between the body and the locking element, and is traversed by the bolt 3. The locking element 17 is moreover provided with a central opening through which the rear end of the lamp projects. The resilient element securely holds the annulus in its operative position, and the pivotal arrangement allows for convenient removal of the socket but prevents accidental displacement of the same.

The sign or advertising element herein is constructed from sheet cardboard and comprises a body portion 30 having in this instance stenciled letters 31 cut therethrough. The sign is of relatively narrow dimension and is diametrically disposed across, and spaced outwardly from the base end of the conical reflector, so that the outer ends of the sign may engage with the tire casing as shown. The sign or advertising element may, however, be of greater or less width or length and may entirely close the base end of the reflector. A backing of light permeable material 32 is placed or secured at the back of the sign and allows the passage of light through the stenciled letters. The material may be either translucent or transparent and any suitable material of this kind may be used as a backing for stenciled letters or characters, or the sign may be composed of a single sheet of translucent or transparent material and the letters may be painted or impressed directly thereon. It is obvious that the character of the advertising matter may be varied to suit requirements.

Figure 2:
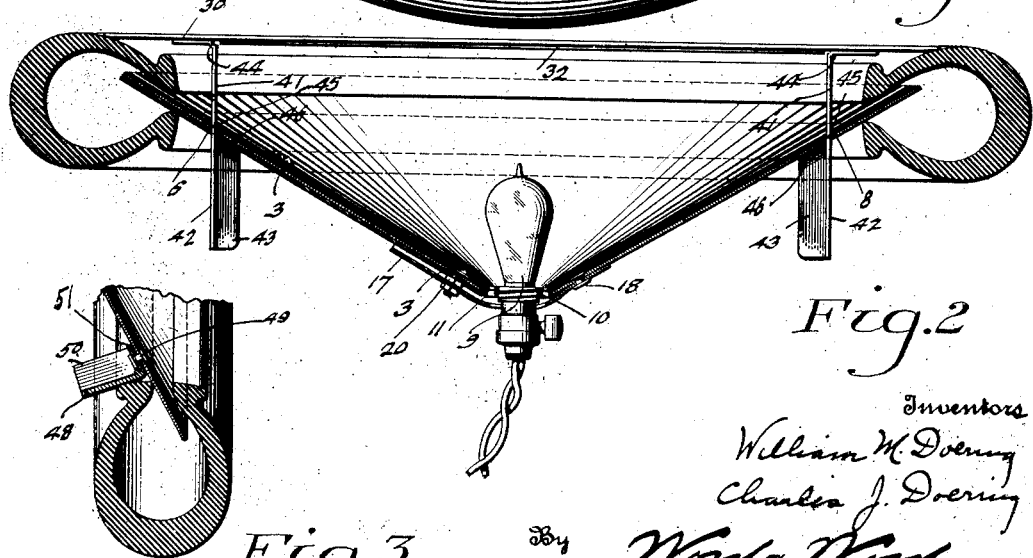
Figure 2 is a horizontal section on line 2—2 of Fig. 1.
Figure 3:
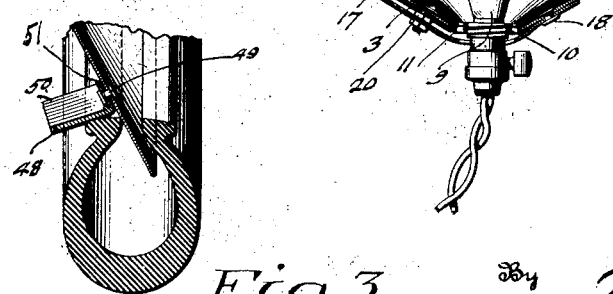
Figure 3 is a detail section on line 3—3 of Fig. 1, illustrating the stop for supporting and centering the reflector within the tire casing.

In order to provide a knockdown device the sign is detachably secured to the reflector by substantially T-shaped fastening devices, preferably of paper. Each fastening device has a base portion 41 which is insertable through one of the slots of the reflector body, and each has a shank portion 42 provided with a tab or flap 43 which after the insertion of the shank through the slot is turned at right angles thereto to frictionally engage the back of the reflector body. The locking devices are glued or suitably fastened to the back of the sign and each base 41 is scored as at 44 to provide a hinge. As shown in Fig. 2, when the flap 43 is folded, its inner edge 46 engages with the rear side of the reflector and positively forces the stop edges 45 of the base portion 41 against the inner face of the reflector. When the sign is detached for shipment the fastening devices may be turned to a flat position, as shown in Fig. 7. The device as illustrated in Figs. 1 to 7, inclusive, is particularly adapted for insertion within a tire casing, as shown in Figs. 1 and 2, and will, without further adjustment substantially fit any sized tire casing. Additional circumferentially aligned openings corresponding to openings 4 and 5 may, however, be provided to permit circumferential adjustment of the reflector to change its diameter.

A stop element 48 is pivotally attached as at 49 adjacent the outer or base end of the reflector and at its rear, which stop is adapted to limit the insertion of the reflector into the casing and to center the reflector therein. The stop is preferably made of cardboard and has parallel side flaps 50 designed in this instance to turn upwardly to dispose the ends 51 in engagement with the reflector. These ends 51 engage the reflector to prevent further bending of the stop in upward direction. (See Fig. 3). The outer or lower edge of the reflector may, however, be made to engage the inner periphery of the casing to limit the insertion of the reflector and to center the same. The device hereinbefore described is particularly adapted to be supported in display position by the tire, and the reflector after preliminary setting up may be inserted within any sized casing without further adjustment. The interior of the reflector may be colored, or the same may be constructed of colored material. The light permeable material used as a backing for the advertising element may also be variously colored. In this form of the device the light disseminated by the illuminating device traverses the light permeable backing and silhouettes the letters while a portion of the light is projected outwardly around the sign, producing a rayed effect.

The device may be very cheaply made and because of its knockdown formation permits of shipment of large quantities in comparatively small space.

Figure 8:
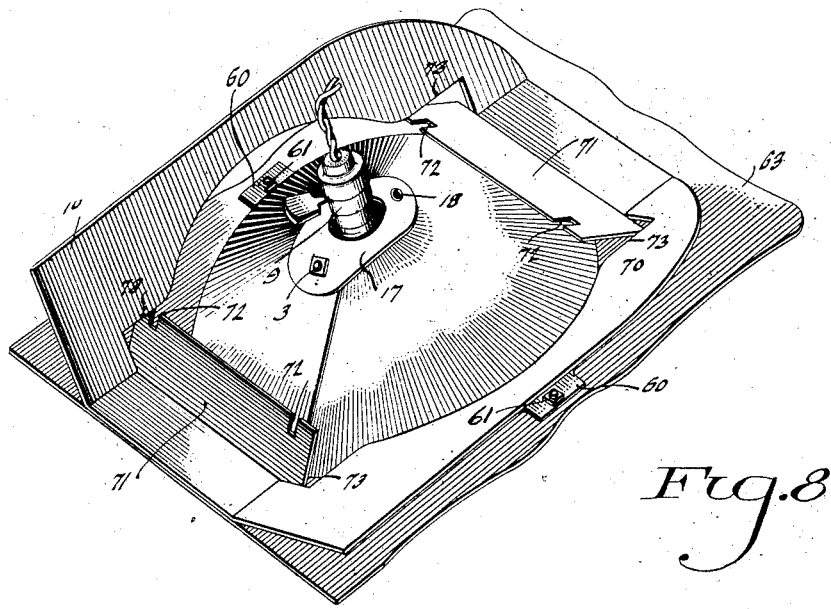
Figure 8 is a perspective view showing the reflector attached to an advertising device in the form of a placard which placard has means thereon for supporting it in upright position.
Figure 9:
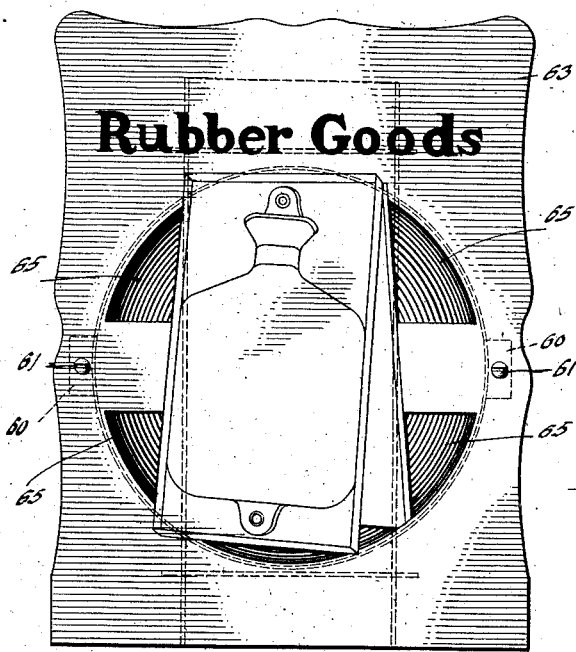
Figure 9 is a face view of the structure shown in Fig. 8.

In the form of the device shown in Figs. 8 and 9, the reflector body is provided at its periphery with diametrically related tabs 60 through which are inserted fastening devices 61, which traverse a placard 63 of sheet material. The face of the placard has printed thereon in this instance a pictorial representation of a hot water bag or bottle, held upon an easel-like display device, and the material of the placard 63 is cut away as at 65 at each side of the pictorial representation to provide openings through which light may be projected. It will be understood that the design may be changed to suit the character of the advertising to be had, the principal feature of this form being that rays of light are projected outwardly around the object or pictorial representation forming the advertisement.

The placard 63 is supported by a foldable easel-like structure preferably of cardboard providing two oppositely disposed parallel hinged vertical wings 70 and two horizontal wings 71 disposed at right angles, the said wings 71 having notches 72 therein engageable with corresponding vertical edges 73 of the wings 70, whereby said wings may be locked in position to cause their base edges to support the placard. The lighting arrangement is identical in structure with that heretofore described.

Having thus described our invention, what we claim is:

1. In combination with a tire casing, a conical reflector having its base end inserted within the tire casing, a placard of less width than the base end of the reflector and attached thereto diametrically thereacross, and disposed at the outside of the tire, said placard having light permeable advertising matter thereon, and means adjacent the apex of the reflector for illuminating the interior thereof and for projecting rays through and around the placard.

2. In combination with an automobile tire casing, a conical reflector having its base end inserted within the casing, means disposed within the reflector adjacent the apex for illuminating the interior of the reflector, a placard of less width than the base end of the reflector removably locked thereto and extending entirely across said base end and engaging the outside of the tire, said placard partly composed of light permeable material and having suitable characters or devices thereon, whereby light may be reflected through the placard and around the same at opposite sides.

3. A tire advertising device comprising a concave reflector the rim of which extends into the hollow interior of an unmounted tire casing, the tire casing thus supporting the reflector, a light source located within said concave reflector, and a sign disposed across the side of the tire, portions of said sign being more light permeable in order to visually accentuate the advertising display thereon.

In witness whereof, we hereunto subscribe our names.

WILLIAM M. DOERING.
CHARLES J. DOERING.